June 2, 1953  N. B. SMITH  2,640,709

PUSHER TYPE COUPLER

Filed May 22, 1951

INVENTOR
NELLIE B. SMITH

BY
McMorrow, Berman & Davidson
ATTORNEYS

Patented June 2, 1953

2,640,709

UNITED STATES PATENT OFFICE 2,640,709

PUSHER TYPE COUPLER

Nellie B. Smith, Mellwood, Ark.

Application May 22, 1951, Serial No. 227,595

3 Claims. (Cl. 280—33.13)

This invention appertains to improvements for coupling a trailer or draft vehicle to a power vehicle and has for its primary object to provide a coupler, whereby a rigid connection is established between the power vehicle and trailer during reverse movement and whereby a connection having a limited but sufficient universal movement is provided during draft movements.

Another object of this invention is to provide a coupler, which will not possess any intermovement during reverse operation of the power vehicle, so that a straight and rigid draft connection between the power vehicle and the draft vehicle is provided, thus obviating jackknifing of the coupler.

A further object of this invention is to provide a coupler, which consists of a connecting sleeve having a first bar rigidly attached to one end thereof, the first bar being coupled to the draft vehicle, and having a second bar slidably associated therewith, the second bar being attached to the power vehicle and interengaging means being formed on the adjoining ends of the first and second bars, whereby a rigid connection is established between the bars, during reverse movements of the power vehicle.

And yet another object of this invention is to provide a compact coupler, which can be easily and conveniently connected to a power vehicle and trailer.

These and ancillary objects and structural features of merit are attained by this invention, the preferred embodiment of which is set forth in the following description and illustrated in the accompanying drawing, wherein.

Figure 1:
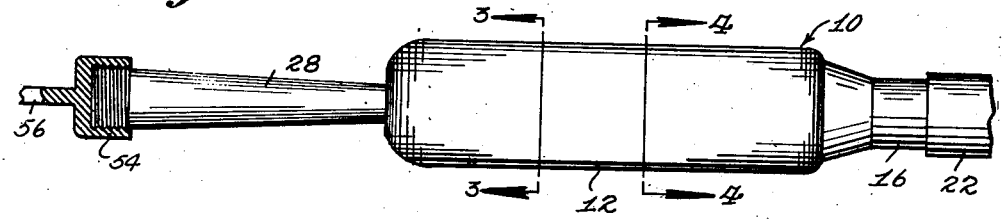
Figure 1 is a plan view of a coupler, constructed in accordance with the principles of this invention.

With continued reference to the accompanying drawing, the coupler 10 includes a connecting sleeve 12, which is formed with a first internally threaded end 14. A first bar 16 is provided with an exteriorly threaded end 18, which is threadedly engaged in the end 14 of the sleeve and the opposing end 20 of the bar is exteriorly threaded for connection to a member 22, which is suitably secured to a draft vehicle or trailer (not shown).

The forward or second end 24 of the sleeve is substantially closed and is formed with an outwardly flared center opening 26 for the slidable reception of an axially tapered second draft bar 28. The draft bar 28 is frusto-conical in shape and the minor end 30 thereof is formed integral with a spherical ball 36. The spherical ball 36 is slidably and swivelly disposed in the sleeve in engagement with the inner wall of the sleeve and is formed at its rearward end with a frusto-conical shaped integral projection 40. The rearwardly extending projection 40 terminates in a flat minor end 42 and the wall 44 of the projection is tapered, so that the projection is adapted to mate with a socket 46, which is formed in the end 18 of the first bar 16.

The socket 46 is frusto-conical shaped and is shaped complemental to the shape of the projection 40, the socket having a flat inner wall 48 and flared side walls 50.

The major or outer end 52 of the second draft bar 28 is exteriorly threaded, and a cap 54 is threadingly engaged on the end 52 of the second bar and is formed on the terminal of a drawer 56, which is suitably connected to a power vehicle (not shown).

In use, the first bar 16 is threaded in the sleeve and connected to the draft member 22, which is connected to the steering mechanism for the trailer or draft vehicle. The second bar 28 is formed as a part of the sleeve, with the spherical ball 36 universally disposed in the sleeve and the bar slidably arranged through the opening 26 in the end wall 24 of the sleeve. The cap 54 of the drawbar 56, which is connected to the power vehicle, is threaded on the bar 28 and a draft connection is established between the power vehicle and the draft vehicle.

Obviously, the ball 36 is swivelly and rotatably arranged in the sleeve, a universal movement being provided, within the limits of the engagement of the side of the bar 28 with the bounding wall of the opening 26 in the end wall 24 of the sleeve.

In reverse movement, the bar 28 will slide rearwardly in the sleeve, until the projection 40 engages in the socket 46, whereupon a rigid draft connection is established between the power vehicle and the trailer, thus obviating jackknifing of the coupler or other defects, inherent with conventional couplers.

Figure 2:
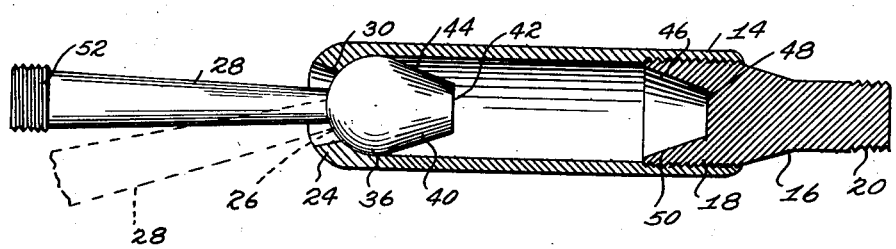
Figure 2 is a longitudinal vertical sectional view thereof.
Figure 3:
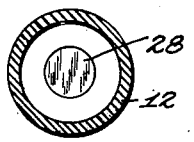
Figure 3 is a transverse sectional view taken on line 3—3 of Figure 1.
Figure 4:
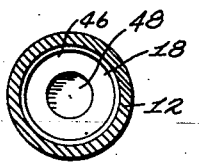
Figure 4 is a transverse sectional view taken on line 4—4 of Figure 1.
Figure 5:
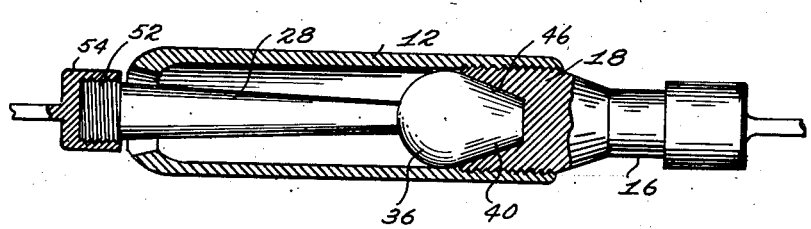
Figure 5 is a longitudinal vertical sectional view of the coupler, with the draft bars depicted in an engaging position.

In draft movements, the bar 28 can move laterally of the sleeve, as seen in Figure 2, and a universal connection is provided, the ball 36 rotating and sliding in the sleeve. Also, the power vehicle does not have to be aligned with the trailer in establishing a draft connection, due to the swinging movement of the bar 28, which can be attached to the power vehicle, while in angular relationship to the sleeve 12 and bar 16.

Having thus described this invention, what is claimed is:

1. A coupler comprising a cylindrical sleeve having a first open end and a second end formed with a conically flared center opening, a first bar detachably affixed at one end to the first end of the sleeve, said end of the bar having a conically tapered socket formed therein and aligned with the opening in the second end of the sleeve, a conically tapered second bar slidably and rotatably disposed through the opening in the second end of the sleeve, and a ball formed on the minor end of the second bar and swivelling in the sleeve, said ball having a projection conformably shaped to nest within the socket.

2. A coupler comprising a cylindrical sleeve having an internally threaded first end and a second end formed with a conically flared center opening, a first bar having one end threaded in the first end of the sleeve, said end of the bar being formed with a conically tapered socket having a flat end wall, an axially, conically tapered second bar slidably disposed through the opening in the second end of the sleeve, and a ball on the minor end of the second bar in slidable and rotatable engagement with the sleeve, said ball having a conical tapered projection terminating in a flat face nesting in the socket when the major end of the second bar is adjacent the opening in the second end of the sleeve.

3. A coupler comprising a cylindrical sleeve having an internally threaded first end, a first bar threaded at one end into said end of the sleeve, said end of the first bar having a conically tapered axial socket formed therein and communicated with the sleeve, a second bar, said sleeve having a second end formed with a conically flared center opening through which the second bar is slidably and rotatably disposed, said second bar being shiftable longitudinally of the sleeve and being rotatable relative to the sleeve in each position to which it is shifted, said second bar being elongated and frustoconical shaped with the major end forming the outer end of the second bar and being adapted to be adjacent the opening in the second end of the sleeve in one extreme position to which the second bar is shifted within the sleeve, the minor end of the second bar being substantially smaller in diameter than the diameter of said opening at the minor end of the opening and having limited universal movement within said opening in an opposite extreme position to which the second bar is shifted, a spherical ball formed on the minor end of the second bar and slidably and rotatably engaged with the sleeve in each of said extreme positions of the second bar, said ball having a conically tapered projection formed complemental to the socket in the first bar and nesting in the socket when the major end of the second bar is adjacent the opening in the second end of the sleeve.

NELLIE B. SMITH.

References Cited in the file of this patent

UNITED STATES PATENTS

| Number | Name | Date |
| --- | --- | --- |
| 1,568,204 | Blade | Jan. 5, 1926 |
| 2,189,667 | Kries | Feb. 6, 1940 |